United States Patent
Hedman et al.

(10) Patent No.: US 9,872,162 B2
(45) Date of Patent: Jan. 16, 2018

(54) PRE-CONFIGURATION OF DEVICES SUPPORTING NATIONAL SECURITY AND PUBLIC SAFETY COMMUNICATIONS

(71) Applicant: Telefonaktiebolaget L M Ericsson (publ), Stockholm (SE)

(72) Inventors: Peter Hedman, Helsingborg (SE); Magnus Olsson, London (GB)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 68 days.

(21) Appl. No.: 14/568,808

(22) Filed: Dec. 12, 2014

(65) Prior Publication Data

US 2015/0230076 A1 Aug. 13, 2015

Related U.S. Application Data

(60) Provisional application No. 61/938,775, filed on Feb. 12, 2014.

(51) Int. Cl.
*H04W 4/00* (2009.01)
*H04W 8/00* (2009.01)
*H04W 76/02* (2009.01)

(52) U.S. Cl.
CPC .......... *H04W 8/005* (2013.01); *H04W 4/008* (2013.01); *H04W 76/023* (2013.01)

(58) Field of Classification Search
CPC ....... H04W 8/00; H04W 76/02; H04W 4/008; H04W 28/18; H04W 8/005;
(Continued)

(56) References Cited

U.S. PATENT DOCUMENTS 8,630,281 B2 * 1/2014 Li ........................ H04J 3/0638
370/350
9,433,025 B2 * 8/2016 Lee ..................... H04W 76/023
(Continued)

FOREIGN PATENT DOCUMENTS

JP 2011526097 A 9/2011

OTHER PUBLICATIONS

3GPP, "3rd Generation Partnership Project; Technical Specification Group Services and System Aspects; Study on architecture enhancements to support Proximity-based Services (ProSe) (Release 12)", 3GPP TR 23.703 V1 .1.0, Jan. 2014, 324 pages.*
(Continued)

*Primary Examiner* — Edan Orgad
*Assistant Examiner* — Vanneilian Lalchinthang
(74) *Attorney, Agent, or Firm* — Murphy, Bilak & Homiller, PLLC

(57) ABSTRACT

Techniques for distributing and using application codes and discovery filters in device-to-device (D2D) wireless devices. An example method for an announcing device includes receiving, from a coordinating node, first and second application codes and associated timing information. The associated timing information defines respective first and second validity intervals for the first and second application codes, such that the first and second validity intervals are at least partly non-overlapping. The method further comprises subsequently transmitting, during the first validity interval, one or more discovery messages that include or are based on the first application code, and transmitting, during the second validity interval, one or more discovery messages that include or are based on the second application code. Corresponding techniques for monitoring devices are also disclosed.

32 Claims, 10 Drawing Sheets

(58) Field of Classification Search
CPC ..... H04W 76/023; H04W 84/18; H04W 4/00; H04L 29/08; H04L 61/2069
USPC .......................................................... 370/254
See application file for complete search history.

(56) References Cited

U.S. PATENT DOCUMENTS

| | | | | |
|---|---|---|---|---|
| 2002/0045458 | A1* | 4/2002 | Parantainen | H04W 40/00 455/466 |
| 2002/0141359 | A1* | 10/2002 | Jei | H04W 72/1289 370/329 |
| 2007/0129088 | A1* | 6/2007 | Gao | H04W 36/24 455/464 |
| 2009/0125635 | A1* | 5/2009 | Barga | G06F 11/0793 709/231 |
| 2009/0232059 | A1* | 9/2009 | Sundberg | H04W 76/025 370/329 |
| 2010/0210275 | A1* | 8/2010 | Navratil | H04W 72/042 455/450 |
| 2013/0061301 | A1* | 3/2013 | Novak | H04L 63/0846 726/6 |
| 2013/0252610 | A1* | 9/2013 | Kim | H04W 4/005 455/435.1 |

OTHER PUBLICATIONS

3GPP, "3rd Generation Partnership Project; Technical Specification Group Services and System Aspects; Feasibility study for Proximity Services (ProSe) (Release 12)", 3GPP TR 22.803 V12.2.0, Jun. 2013, 1-45.

3GPP, "3rd Generation Partnership Project; Technical Specification Group Services and System Aspects; Study on architecture enhancements to support Proximity-based Services (ProSe) (Release 12)", 3GPP TR 23.703 V1.1.0, Jan. 2014, 1-324.

Unknown, Author, "Change of Application Code in Discovery procedures", Ericsson, SA WG2 Meeting #102, S2-141469, Change Request, St. Julian's, Malta, Mar. 24-28, 2014, 1-4.

* cited by examiner

PRE-CONFIGURATION OF DEVICES SUPPORTING NATIONAL SECURITY AND PUBLIC SAFETY COMMUNICATIONS

TECHNICAL FIELD

The technology disclosed herein relates generally to wireless communication networks, and more particularly relates to discovery techniques for wireless device-to-device communications.

BACKGROUND

Device-to-device (D2D) communication is a well-known and widely used component of many existing wireless technologies, including ad hoc and cellular networks. Examples include Bluetooth and several variants of the IEEE 802.11 standards suite, such as WiFi Direct. These example systems operate in unlicensed spectrum.

Although the idea of enabling D2D communications as a means of relaying in cellular networks was proposed by some early works on ad hoc networks, the concept of allowing local D2D communications to (re)use cellular spectrum resources simultaneously with ongoing cellular traffic is relatively new. Because the non-orthogonal resource sharing between the cellular and the D2D layers has the potential of reuse gain and proximity gain, along with increased resource utilization, the concept of D2D communications underlying cellular networks has received considerable interest in recent years.

The Third Generation Partnership Project (3GPP) refers to Network Controlled D2D as "Proximity Services" or "ProSe," and efforts aimed at integrated D2D functionality into the Long Term Evolution (LTE) specifications are underway. A ProSe Study Item (SI) recommended supporting D2D operation between wireless devices—referred to as user equipments or UEs by 3GPP—that are outside of network coverage, as well as operation between in-coverage and out-of-coverage wireless devices.

Specifically, in 3GPP LTE networks, such LTE Direct (D2D) communication can be used in commercial applications, such as cellular network offloading, proximity based social networking. D2D communications involving out-of-coverage operation are expected to be particularly important in so-called national security and public safety services (NSPS), such as in public safety situations in which first responders need to communicate with each other and with people in a disaster area. Both commercial and public safety applications are among the use cases discussed in the feasibility study performed by members of the $3^{rd}$-Generation Partnership Project (3GPP) and documented in the report "$3^{rd}$ Generation Partnership Project; Technical Specification Group Services and System Aspects; Feasibility study for Proximity Services (ProSE)," 3GPP TR 22.803, v. 12.2.0 (June 2013), available at www.3gpp.org.

D2D communication entities using an LTE Direct link may reuse the same physical resource blocks ("PRBs," the basic time-frequency resource in the LTE radio link) as used for cellular communications either in the downlink or in the uplink or both. The reuse of radio resources in a controlled fashion can lead to the increase of spectral efficiency at the expense of some increase of the intra-cell interference.

Typically, D2D communicating entities in an LTE-underlying scenario will use uplink (UL) resources, such as UL PRBs or UL time slots, but conceptually it is possible that D2D (LTE Direct) communications takes place in the cellular downlink (DL) spectrum or in DL time slots. For ease of presentation, in the present disclosure it is assumed that D2D links use uplink resources, such as uplink PRBs in a Frequency-Division Duplexing (FDD) LTE system, or uplink time slots in an cellular Time-Division Duplexing (TDD) system, but the essential ideas disclosed herein may be readily applied to cases in which D2D communications take place in DL spectrum as well.

An important aspect of D2D communications is the concept of "discovery," which deals with the techniques and procedures used by a D2D device to detect the proximity of other devices that are capable of and authorized to engage in D2D communications.

The 3GPP technical report titled "Study on architecture enhancements to support Proximity-based Services (ProSe)," briefly outlines several approaches to discovery, including an "LTE based solution for direct discovery." (3GPP TR 23.703, sec. 6.1, v1.1.0 (January 2014).) As shown in this document, an "announcing UE," i.e., a wireless device that wishes to make its services or need for services known to other devices, receives a so-called expression code from a ProSe function in or attached to the LTE network, e.g., in a ProSe server, and broadcasts the received expression code. Other wireless devices, referred to in 3GPP documentation as "monitoring UEs," monitor for broadcasts from announcing UEs and compare any received expression code to one or more expression codes that they may have previously received, to detect the presence of announcing UEs they are interested in communicating with.

Although details of the exact discovery procedures to be carried out by 3GPP-compatible devices are still being developed, section 6.1.13 of the 3GPP technical report referenced above describes a network-controlled discovery procedure in which one or more "application IDs," which can be viewed as examples of the "expression codes" discussed above, are allocated to announcing and monitoring UEs. These application codes have a limited life, and are associated with a validity timer that begins at the time the application codes are allocated. The announcing UE is allowed to broadcast a ProSe_Code that includes the application code until the validity timer expires. Monitoring UEs monitor the appropriate radio resources, "listening" for a ProSe_Code that includes an application code corresponding to an application code that has been allocated to it. Once the validity timer expires, the announcing UE must initiate a new request to the ProSe function to receive a new application code or codes.

SUMMARY

According to several embodiments of the presently disclosed techniques, more than one access code to be used for announcing purposes is allocated to announcing wireless devices, with each access code having a distinct validity time interval. These access codes used for announcing purposes are referred to as "application codes" herein. Likewise, more than one access code to be used for monitoring purposes is allocated to monitoring wireless devices, again with each access code having a distinct validity time interval. The access codes used for monitoring purposes are referred to as "discovery filters" herein. In both cases, time intervals for these codes can be consecutive or partly overlapping, so as to provide a seamless transition between one access code and another, without requiring an intervening request for a new access code.

An example method is suitable for implementation in a wireless device configured for operation in a wireless communication network and further configured for device-todevice communication with one or more other wireless devices. This example method includes receiving, from a coordinating node, first and second application codes and associated timing information. The associated timing information defines respective first and second validity intervals for the first and second application codes, such that the first and second validity intervals are at least partly non-overlapping. The method further comprises subsequently transmitting, during the first validity interval, one or more discovery messages that include or are based on the first application code, and transmitting, during the second validity interval, one or more discovery messages that include or are based on the second application code.

In some embodiments, the first and second application codes and associated timing are received in response to an application code request sent to the coordinating node, via the wireless communication network.

In some embodiments, the associated timing information defines completely non-overlapping first and second validity intervals. In some embodiments, the associated timing information comprises first and second time-to-live values, the first and second time-to-live values indicating respective lengths of the first and second validity intervals. In some of these latter embodiments, the second validity interval begins at the end of the first validity interval. In others, the associated timing information comprises a start time value indicating a start time for the second validity interval, such that the second validity interval begins before the end of the first validity interval.

Another example method is also suitable for a wireless device configured for operation in a wireless communication network and further configured for device-to-device communication with one or more other wireless devices. This example method begins with receiving first and second discovery filters and associated timing information, the associated timing information defining respective first and second validity intervals for the first and second discovery filters, such that the first and second validity intervals are at least partly non-overlapping. The method further comprises monitoring, during the first validity interval, for a discovery message that includes or is based on the first discovery filter, and monitoring, during the second validity interval, for a discovery message that includes or is based on the second discovery filter.

Once again, the associated timing information may define completely non-overlapping first and second validity intervals, in some embodiments. In some embodiments, the associated timing information comprises first and second time-to-live values, the first and second time-to-live values indicating respective lengths of the first and second validity intervals. In some of these latter embodiments, the second validity interval begins at the end of the first validity interval. In others, the associated timing information comprises a start time value indicating a start time for the second validity interval, such that the second validity interval begins before the end of the first validity interval.

Another example embodiment according to the several techniques and apparatus disclosed herein is a method suitable for implementation in one or more network nodes adapted to provide D2D-related services to wireless devices operating in a wireless communication network. This example method begins with receiving an application code request from a first wireless device, and continues with sending first and second application codes and associated timing information to the first wireless device. Once more, the associated timing information defines respective first and second validity intervals for the first and second application codes, such that the first and second validity intervals for the first and second application codes are at least partly non-overlapping.

In some embodiments, the one or more network nodes are also configured to provide discover filters to one or more wireless devices, for monitoring purposes. Thus, in some embodiments the method further comprises receiving a discovery filter request from a second wireless device and sending first and second discovery filters and associated timing information to the second wireless device. The associated timing information defines respective first and second validity intervals for the first and second discovery filters, such that the first and second validity intervals for the first and second discovery filters are at least partly non-overlapping. In some embodiments, the first and second discovery filters correspond to the first and second application codes, respectively, such that monitoring by the second wireless device using the first and second discovery filters will detect discovery messages based on the first and second application codes, respectively.

In the detailed description that follows, the methods summarized above are described in detail. In addition, corresponding apparatus configured to carry out these methods and variants thereof are described.

DETAILED DESCRIPTION

Figure 1:
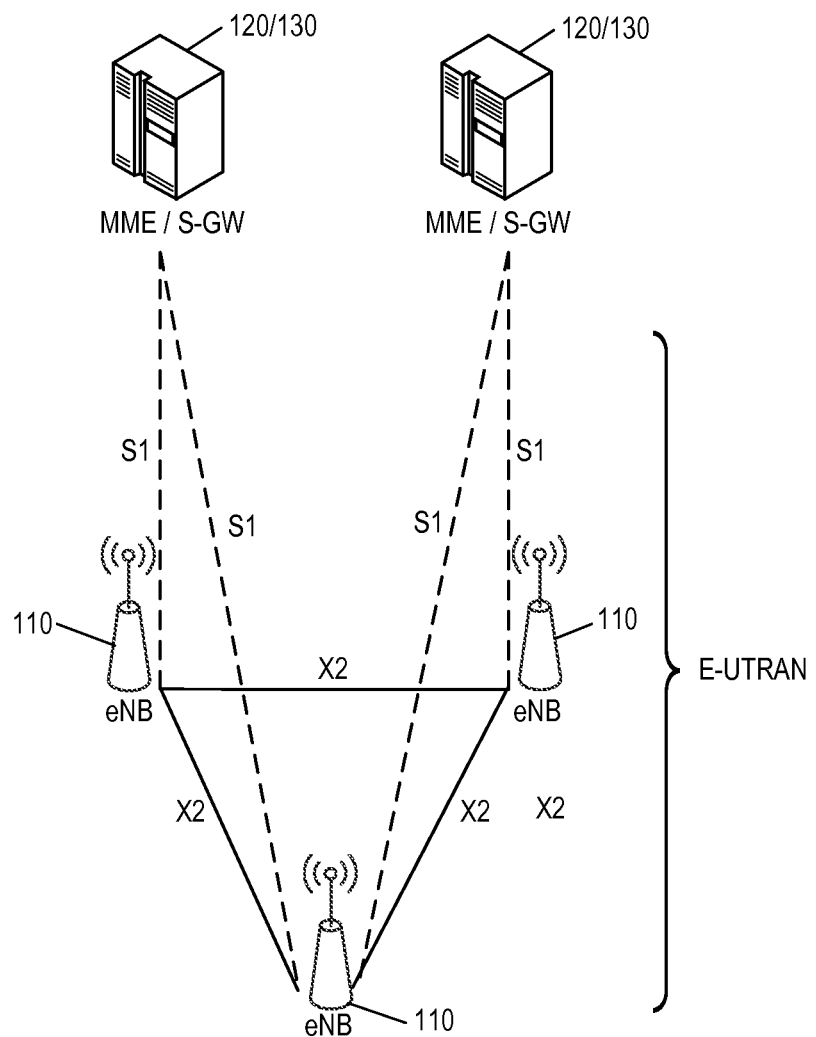
FIG. 1 is a schematic diagram illustrating a portion of an example Long-Term Evolution (LTE) network.

Inventive concepts will now be described more fully hereinafter with reference to the accompanying drawings, in which examples of embodiments of inventive concepts are illustrated. These inventive concepts may, however, be embodied in many different forms and should not be construed as limited to the embodiments set forth herein. Rather, these embodiments are provided so that this disclosure will be thorough and complete, and fully convey the scope of present inventive concepts to those skilled in the art. It should also be noted that these embodiments are not mutually exclusive. Components from one embodiment may be tacitly assumed to be present or used in another embodiment.

For purposes of illustration and explanation only, some embodiments of the present inventive concepts are described herein in the context of operating in or in association with a Radio Access Network (RAN) that communicates over radio communication channels with mobile terminals (also referred to as wireless terminals or UEs).

In some embodiments of a RAN, for example, several base stations may be connected (e.g., by landlines or radio channels) to a radio network controller (RNC). A radio network controller, also sometimes termed a base station controller (BSC), may supervise and coordinate various activities of the plural base stations connected thereto. A radio network controller may be connected to one or more core networks. According to some other embodiments of a RAN, base stations may be connected to one or more core networks without a separate RNC(s) between, for example, with functionality of an RNC implemented at base stations and/or core networks.

As used herein, the terms "mobile terminal," "wireless terminal," "wireless device," "user equipment," or "UE" may be used to refer to any device that receives data from and transmits data to a communication network, any of which may be for example, a mobile telephone ("cellular" telephone), laptop/portable computer, pocket computer, hand-held computer, desktop computer, a machine to machine (M2M) or MTC type device, a sensor with a wireless communication interface, etc. Devices of any of these types may be adapted, according to known techniques and according to the additional techniques disclosed herein, for operation in a device-to-device (D2D) mode, where such operation may include the transmitting and receiving of certain signals that are similar to or identical with corresponding signals used when operating within a cellular network, i.e., in a device-to-base-station operating mode.

Note that although terminology from specifications for the Long-Term Evolution (LTE; also referred to as the Evolved Universal Terrestrial Radio Access Network, or E-UTRAN and or the Universal Mobile Telecommunications System (UMTS) is used in this disclosure to exemplify embodiments of the inventive concepts, this should not be seen as limiting the scope of the presently disclosed techniques to only these systems. Devices designed for use in other wireless systems, including variations and successors of 3GPP LTE and WCDMA systems, WiMAX (Worldwide Interoperability for Microwave Access), UMB (Ultra Mobile Broadband), HSDPA (High-Speed Downlink Packet Access), GSM (Global System for Mobile Communications), etc., may also benefit from exploiting embodiments of present inventive concepts disclosed herein.

Also note that terminology such as base station (also referred to as NodeB, eNodeB, or Evolved Node B) and wireless terminal or mobile terminal (also referred to as User Equipment node or UE) should be considering non-limiting and does not imply a certain hierarchical relation between the two. In general, a base station (e.g., a "NodeB" or "eNodeB") and a wireless terminal (e.g., a "UE") may be considered as examples of respective different communications devices that communicate with each other over a wireless radio channel.

The Evolved UMTS Terrestrial Radio Access Network (E-UTRAN) includes base stations called enhanced NodeBs (eNBs or eNodeBs), providing the E-UTRA user plane and control plane protocol terminations towards the UE. The eNBs are interconnected with each other using the X2 interface. The eNBs are also connected using the S1 interface to the EPC (Evolved Packet Core), more specifically to the MME (Mobility Management Entity) by means of the S1-MME interface and to the Serving Gateway (S-GW) by means of the S1-U interface. The S1 interface supports many-to-many relation between MMEs/S-GWs and eNBs. A simplified view of the E-UTRAN architecture is illustrated in FIG. 1.

The eNB 110 hosts functionalities such as Radio Resource Management (RRM), radio bearer control, admission control, header compression of user plane data towards serving gateway, and/or routing of user plane data towards the serving gateway. The MME 120 is the control node that processes the signaling between the UE and the CN (core network). Significant functions of the MME 120 are related to connection management and bearer management, which are handled via Non Access Stratum (NAS) protocols. The S-GW 130 is the anchor point for UE mobility, and also includes other functionalities such as temporary DL (down link) data buffering while the UE is being paged, packet routing and forwarding to the right eNB, and/or gathering of information for charging and lawful interception. The PDN Gateway (P-GW, not shown in FIG. 1) is the node responsible for UE IP address allocation, as well as Quality of Service (QoS) enforcement (as further discussed below). The reader is referred to 3GPP TS 36.300 and 3GPP TS 23.401, as well as the references provided therein, for further details of functionalities of the different nodes.

Figure 2:
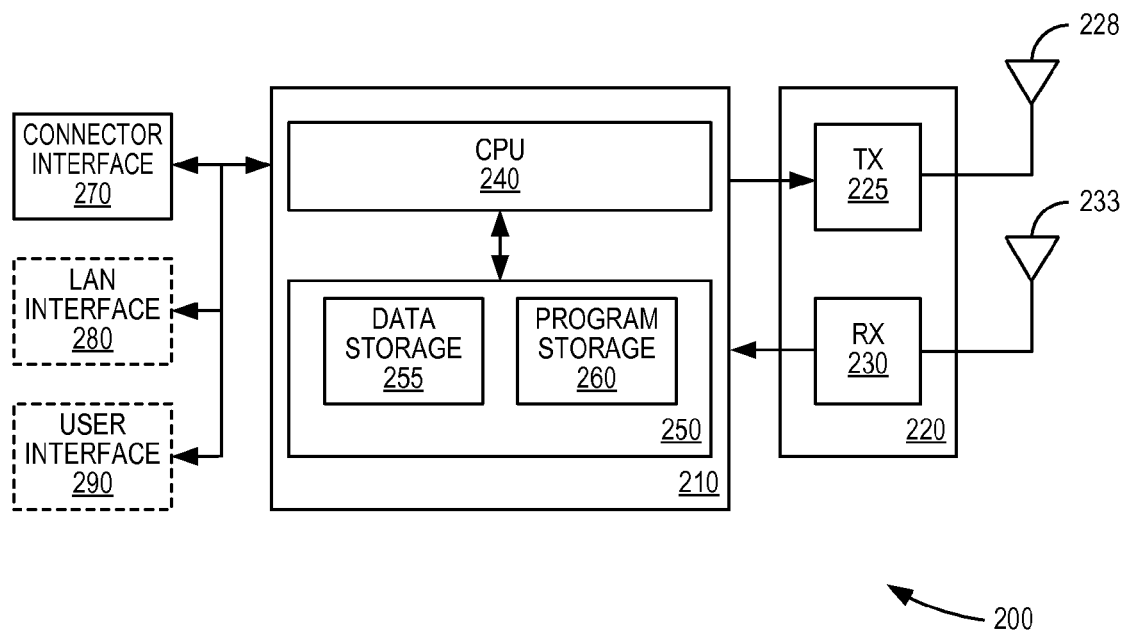
FIG. 2 is a block diagram of an example wireless device according to some embodiments of the disclosed techniques and apparatus.

Several of the techniques and methods described herein are implemented using radio circuitry, electronic data processing circuitry, and other electronic hardware provided in a mobile terminal. FIG. 2 illustrates features of an example mobile terminal 200 according to several embodiments of the present invention. Mobile terminal 200, which may be a UE configured for operation with an LTE wireless communication network (E-UTRAN), for example, as well as for operation in a device-to-device mode, comprises a radio transceiver circuit 220 configured to communicate with one or more base stations as well as a processing circuit 210 configured to process the signals transmitted and received by the transceiver unit 220. Transceiver circuit 220 includes a transmitter 225 coupled to one or more transmit antennas 228 and receiver 230 coupled to one or more receiver antennas 233. The same antenna(s) 228 and 233 may be used for both transmission and reception.

Receiver 230 and transmitter 225 use known radio processing and signal processing components and techniques, typically according to a particular telecommunications standard such as the 3GPP standards for LTE. Note also that transmitter circuit 220 may comprise separate radio and/or baseband circuitry for each of two or more different types of radio access network, in some embodiments. The same applies to the antennas—while in some cases one or more antennas may be used for accessing multiple types of networks, in other cases one or more antennas may be specifically adapted to a particular radio access network or networks. Because the various details and engineering tradeoffs associated with the design and implementation of such circuitry are well known and are unnecessary to a full understanding of the invention, additional details are not shown here.

Processing circuit 210 comprises one or more processors 240 coupled to one or more memory devices 250 that make up a data storage memory 255 and a program storage memory 260. Processor 240, identified as CPU 240 in FIG. 2, may be a microprocessor, microcontroller, or digital signal processor, in some embodiments. More generally, processing circuit 210 may comprise a processor/firmware combination, or specialized digital hardware, or a combination thereof. Memory 250 may comprise one or several types of memory such as read-only memory (ROM), random-access memory, cache memory, flash memory devices, optical storage devices, etc. Because terminal 200 may support multiple radio access networks, including, for example, a wide-area RAN such as LTE as well as a wireless local-area network (WLAN), processing circuit 210 may include separate processing resources dedicated to one or several radio access technologies, in some embodiments. Again, because the various details and engineering tradeoffs associated with the design of baseband processing circuitry for mobile devices are well known and are unnecessary to a full understanding of the invention, additional details are not shown here.

Typical functions of the processing circuit 210 include modulation and coding of transmitted signals and the demodulation and decoding of received signals. In several embodiments of the present invention, processing circuit 210 is adapted, using suitable program code stored in program storage memory 260, for example, to carry out one of the techniques specifically described herein, including, for example, one or more of the methods illustrated in FIGS. 4 and 5 and variants thereof. Of course, it will be appreciated that not all of the steps of these techniques are necessarily performed in a single microprocessor or even in a single module.

Mobile terminal 200 may further include one or more additional interface circuits, depending on the specific application for the unit. Typically, mobile terminal 270 includes connector interface circuitry 270. In some embodiments, connector interface circuitry 270 may consist of no more than terminals and associated hardware to support charging of an on-board battery (not shown) or to provide direct-current (DC) power to the illustrated circuits. More often, connector interface circuitry 270 further includes a wired communication and/or control interface, which may operate according to proprietary signaling and message formats in some embodiments, or according to a standardized interface definition, in others. For example, connector interface 270 may comprise terminals and associated hardware for support of the well-known Universal Serial Bus (USB) interface. It will be appreciated that while connector interface circuitry 270 includes at least the necessary receiver and driver circuits to support such an interface and may further comprise specialized hardware/firmware, part of the interface functionality may be provided by CPU 240, configured with appropriate firmware and/or software in memory 250, in some embodiments.

Mobile terminal 200 may further comprise local-area network (LAN) interface circuitry 280, in some embodiments. In some embodiments, for example, LAN interface circuitry 280 may provide support for wireless LAN (WLAN) functionality, such as according to the well-known Wi-Fi standards. In some such embodiments, LAN interface circuitry 280 may include an appropriate antenna or antennas. In other embodiments, LAN interface circuitry 280 may make use of one or more common antenna structures that provide reception and/or transmission of WLAN signals as well as wide-area RAN signals. In some embodiments, LAN interface circuitry 280 may be relatively self-contained, in that it includes all of the necessary hardware, firmware, and/or software to carry out the LAN functionality, including the associated protocol stacks. In other embodiments, at least parts of the LAN functionality may be carried out by processing circuit 210.

Still further, mobile terminal 200 may include user-interface circuitry 290, which may include, for example, circuitry and/or associated hardware for one or more switches, pushbuttons, keypads, touch screens, and the like, for user input, as well as one or more speakers and/or displays for output. Of course, some mobile terminals, such as those developed for machine-to-machine applications or for insertion into another device (e.g., a laptop computer) may have only a subset of these input/output devices, or none at all.

As discussed above, 3GPP is developing specifications for proximity services, often referred to as "ProSe," which include specifications for device-to-device (D2D) operation utilizing the same time-frequency resources used by LTE networks, in each of several possible operating modes that include in-coverage operation (where the involved D2D devices are all within the coverage area of an LTE network), out-of-coverage operation (where none of the devices are within the coverage area of an LTE network), and combinations of both. As noted above, D2D communications involving out-of-coverage operation are expected to be particularly important in so-called national security and public safety services (NSPS), such as in public safety situations in which first responders need to communicate with each other and with people in a disaster area.

Several of the techniques and processes described above can be implemented in a network node, such as in a node of a wireless communication system's core network, or in a so-called ProSe server. Note that ProSe server functionality may be implemented in any of a variety of physical nodes, which may incorporate other functionality as well. Thus, for example, ProSe functionality could be implemented in an eNB or other LTE network node, or in a node in the Evolved Packet Core (EPC). Alternatively, the ProSe functionality may be implemented in a node that is outside the RAN, e.g., in the core network, or even outside both the RAN and the core network.

Figure 3:
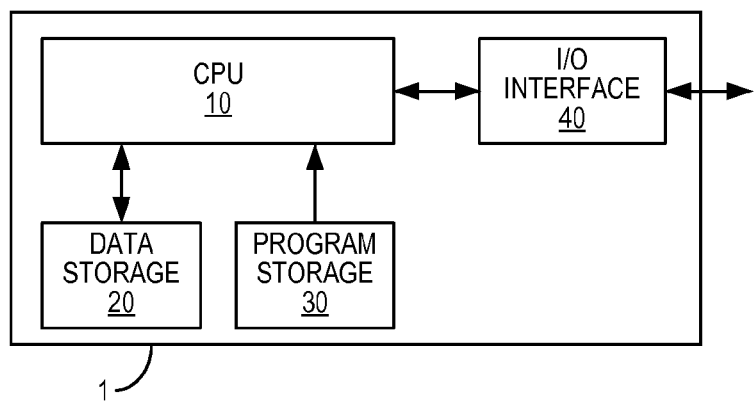
FIG. 3 is a block diagram of an example network node according to some embodiments of the disclosed techniques and apparatus.

FIG. 3 is a schematic illustration of a node 1 in which a method embodying any of the presently described network-based techniques can be implemented. A computer program for controlling the node 1 to carry out a method embodying any of the presently disclosed techniques is stored in a program storage 30, which comprises one or several memory devices. Data used during the performance of a method embodying the present invention is stored in a data storage 20, which also comprises one or more memory devices, one or more of which may be the same as those used for program storage 30, in some embodiments. During performance of a method embodying the present invention, program steps are fetched from the program storage 30 and executed by a Central Processing Unit (CPU) 10, retrieving data as required from the data storage 20. Output information resulting from performance of a method embodying the present invention can be stored back in the data storage 20, or sent to an Input/Output (I/O) interface 40, which includes a network interface for sending and receiving data to and from other network nodes, e.g., via an X2 and/or S1 interface, and which may also include a radio transceiver for communicating with one or more terminals. The CPU 10 and its associated data storage 20 and program storage 30 may collectively be referred to as a "processing circuit." It will be appreciated that variations of this processing circuit are possible, including circuits include one or more of various types of programmable circuit elements, e.g., microprocessors, microcontrollers, digital signal processors, field-programmable application-specific integrated circuits, and the like, as well as processing circuits where all or part of the processing functionality described herein is performed using dedicated digital logic.

Accordingly, in various embodiments of the invention, processing circuits, such as the CPU 10, data storage 20, and program storage 30 in FIG. 3, are configured to carry out one or more of the techniques described in detail above. It should be appreciated that the processing circuit, when configured with appropriate program code, may be understood to comprise several functional "modules," where each module comprises program code for carrying out the corresponding function, when executed by an appropriate processor. Of course, it will be appreciated that not all of the steps of a given technique are necessarily performed in a single microprocessor or, equivalently, that all of the functional modules in a given embodiment are implemented with a single processing circuit.

Figure 4:
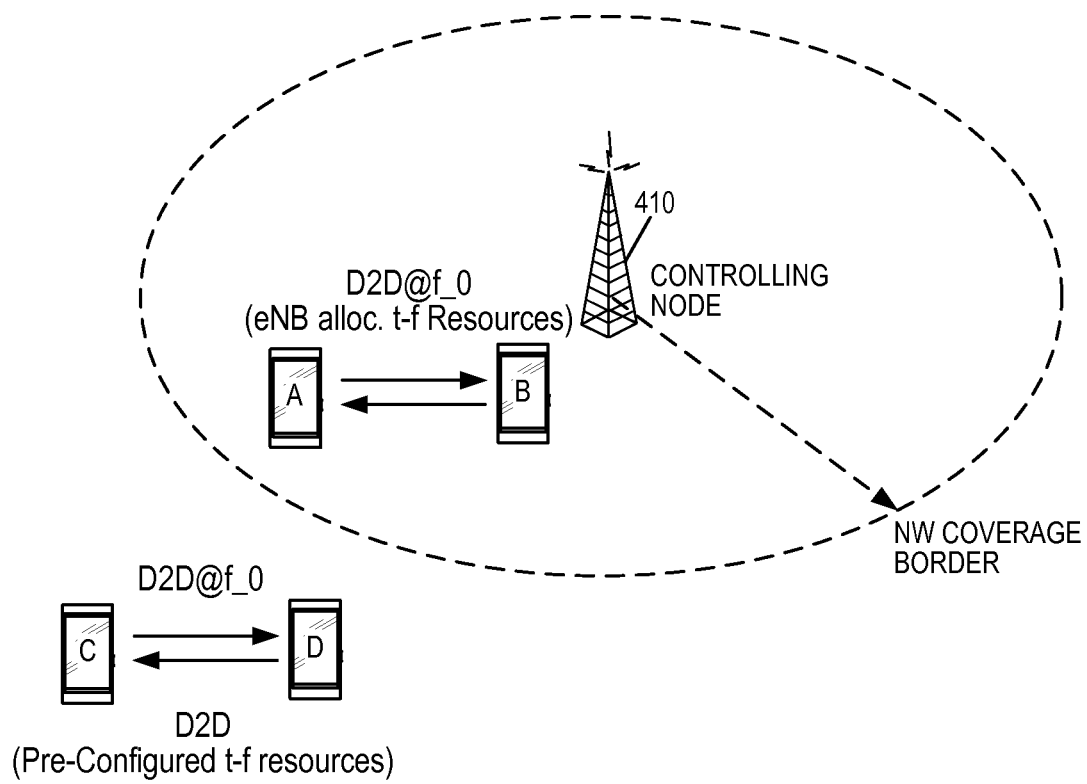
FIG. 4 illustrates in-network and out-of-network device-to-device (D2D) operation.

FIG. 4 illustrate basic principles for D2D communication within LTE, for both in-coverage and out-of-coverage scenarios. A controlling node, e.g., an eNode B or a cluster head, controls the communication on a frequency carrier f_0. (A cluster head is a node, among a "cluster" of nodes in an ad hoc network, that is responsible for routing packets to and from other clusters.) In a first scenario, devices A and B are communicating directly via a D2D link, and both devices are inside network (NW) coverage of the controlling node 410. The controlling node 410 then allocates the radio resources to devices A and B for use in D2D communication. In the second scenario, devices C and D may have D2D communication out of reach from a controlling node, i.e., out of coverage. In this case, the D2D communication devices are using pre-configured time-frequency (t-f) resources for D2D communication. The pre-configuration of these resources may be by standard, for example. In some cases, the pre-configuration of these resources may depend on the device's capabilities. For example, one device might be categorized as an NSPS type 1 device, for police use, while another is categorized as an NSPS type 2 device, for military use. The pre-configuration of these different devices may then differ, depending on their respective capabilities.

As discussed above, procedures for direct discovery are being developed, whereby some wireless devices, referred to as "announcing devices" or "announcing UEs," are configured to transmit announcement messages indicating their desire to communicate with other D2D devices. Other wireless devices, referred to as "monitoring devices," "monitoring UEs," "discovering devices," "discovering UEs," or the like, are configured to monitor the appropriate radio resources to listen for transmitted announcement messages. The announcements may be application specific, and thus some devices may be both announcing devices and monitoring devices at the same time, e.g., for different applications.

As discussed briefly above, 3GPP is working on enhancements needed to support Proximity-based Services (ProSe). More specifically, 3GPP has published a technical report (3GPP TR 23.703, v.1.1.0 (January 2014), available at www.3gpp.org), which describes techniques that may be employed to allow D2D devices to discover other devices in the vicinity. More particularly, these discovery procedures may be used to discover other wireless devices that are using certain specific applications that are of interest. Thus, Section 6.1.13 of 3GPP TR 23.703 describes a network-controlled discovery procedure in which one or more "application IDs," which can be viewed as examples of the "expression codes" mentioned above, are allocated to announcing and monitoring UEs. These application IDs have a limited life, and are associated with a validity timer that begins at the time the application codes are allocated. The validity interval limited by the validity timer may be regarded as "time-to-live" (TTL) for the application code.

The announcing UE is allowed to broadcast a ProSe_Code that includes the application ID until the validity timer expires. Monitoring UEs monitor the appropriate radio resources, "listening" for a ProSe_Code that includes an application ID corresponding to an application ID that has been allocated to it. The Application ID/code is used in the discovery procedure to "match" an announcement, i.e., to determine whether an announcing UE has an application that is of interest for the monitoring UE. Once the validity timer expires, i.e., once the TTL expires, a new application code must be used. According to the procedures defined by the 3GPP technical report 3GPP TR 23.703 v 1.1.0, an announcing UE must initiate a new request to the ProSe function to receive a new application code or codes.

It should be appreciated that various terms may be applied to the "application IDs" and "expression codes" described here, including "application code," "access code," "discovery code," and the like. In some cases, one term might be applied to a code used by an announcing device, while another term is applied to a code used by a monitoring device, even while those codes may have the same value. For example, the terms "access filter," "discovery filter," and the like may be used to refer to an application code (or a parameter corresponding to an application code) used by a monitoring device to detect announcements of interest. For the purposes of the presently disclosed techniques, all of these terms should be understood to be interchangeable, except as indicated otherwise by the contexts in which the terms appear. For clarity, however, the description of several embodiments will use the term "application code" to refer to those codes that are distributed to wireless devices for announcing purposes, while the term "discovery filter" may be used to refer to those codes that are distributed to wireless devices for monitoring purposes. These codes may be identical, in some embodiments, or may have common components or components that can be derived from one another, in various embodiments.

The solution described in 3GPP TR 23.703, v1.1.0 (January 2014), requires monitoring and announcing UEs to request new application codes when the TTL of the existing Application code expires. This may cause a signaling storm to the functionality that allocates these codes when TTL expires. Further, any delays associated with these new requests may result in gaps in announcements and/or monitoring. This approach does not provide a seamless functionality for the terminals trying to discover other terminals.

Figure 5:
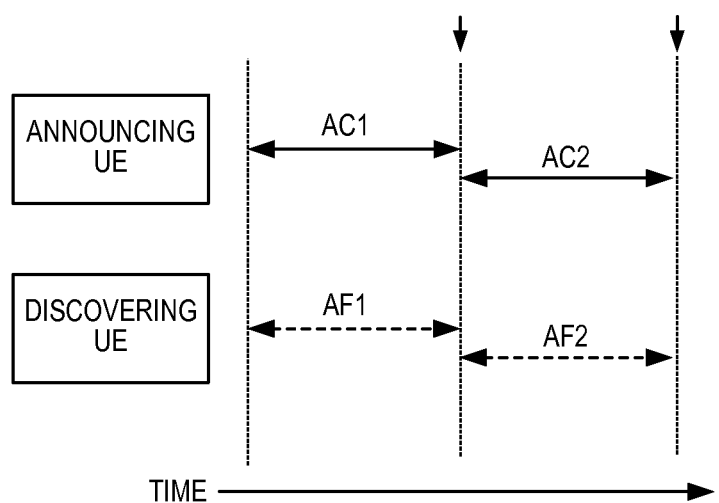
FIG. 5 illustrates the current situation for the distribution and use of access codes.

FIG. 5 illustrates the situation described in 3GPP TR 23.703, v1.1.0. (Note that FIG. 5 refers to "access codes" and "access filters"—For the purposes of the present disclosure, these terms should be understood to be interchangeable with the "application codes" and "application IDs" discussed above.) During a first time interval, the announcing UE uses a first announcing code, "AC1," while a monitoring UE (referred to as a "discovering UE" in FIG. 5) monitors for announcements using a first "access filter." If the announcing UE and discovering UE are in the same vicinity and are using the same application codes, then they will discover each other's presence.

Assuming that the UEs do not discover one another and cease their announcing and monitoring functions, the TTL for the first application code will expire, as shown in FIG. 5. Beginning at that point, the announcing UE and discovering UE must use a new application code for their respective announcing and monitoring functions. To maintain continuous announcing and monitoring functions, there must be a synchronized change of application codes, as indicated in FIG. 5. Delays in receiving these codes may cause gaps in the announcing and/or monitoring functions.

Several embodiments of the presently disclosed techniques and apparatus address this problem by providing for the allocation of multiple application codes at a time (for a given application) to each terminal that that announces, with each of the multiple application codes having a distinct validity interval. Likewise, multiple application codes are provided to monitoring devices, for use as "discovery filters." With this approach, the announcing and monitoring devices need not request a new application code or discovery filter each time a validity interval expires.

The disclosed techniques allow a seamless transition from using an old application code to using a new application code. This allows the avoidance of signaling storms, caused when multiple wireless devices are requesting new application codes and corresponding discovery filters at the same time. It also allows a continuous discovery procedure, since each D2D device always has a valid application code that can be used for announcing and/or a discovery filter for monitoring. In some of the embodiments detailed below, the validity intervals for each of the application are defined relative to one another—this approach allows the UEs to only run simple timers, since the UEs don't need to be aware of any absolute time.

In some embodiments, then, an announcing UE gets at least two (or more) application codes from a coordinating network node, instead of only one. According to the approach documented in 3GPP TR 23.703, v1.1.0, the application codes are provided by a "ProSe function," which may be implemented on a ProSe server in or associated with a 3GPP Evolved Packet Core (EPC) network. The 3GPP document 3GPP TR 23.703 may be consulted for additional details of the purposes and formats of these application codes, as well as for additional parameters associated with these application codes. This ProSe function may thus be adapted in accordance with the presently disclosed techniques to provide two or more application codes at a time, rather than just one.

In embodiments of the presently disclosed techniques, each application code has a different, possibly overlapping, validity interval. In a first alternative, these application codes are used one after the other. Thus, for a specific purpose (application), an announcing UE only announces with one application code and the UE change Application code when the validity time for this application code expires. In a second alternative, the validity times for two application codes may partly overlap, such that the UE announces with two application codes during a transition phase in which the validity intervals for the two application codes overlap.

Similarly, a monitoring UE gets at least two discovery filters from the ProSe function, instead of only one. (Again, 3GPP TR 23.703 may be consulted for purpose and additional parameters). Each discovery filter has a different validity interval, such that the validity intervals for two application codes may be completely distinct or may partly overlap. In some embodiments and/or during some intervals, the monitoring UE always has to compare with the available Discovery filters towards the announced Application code(s) for a match. In some embodiments and/or during some intervals, the monitoring UE only compares with the Discovery filter(s) that is active.

Figure 6:
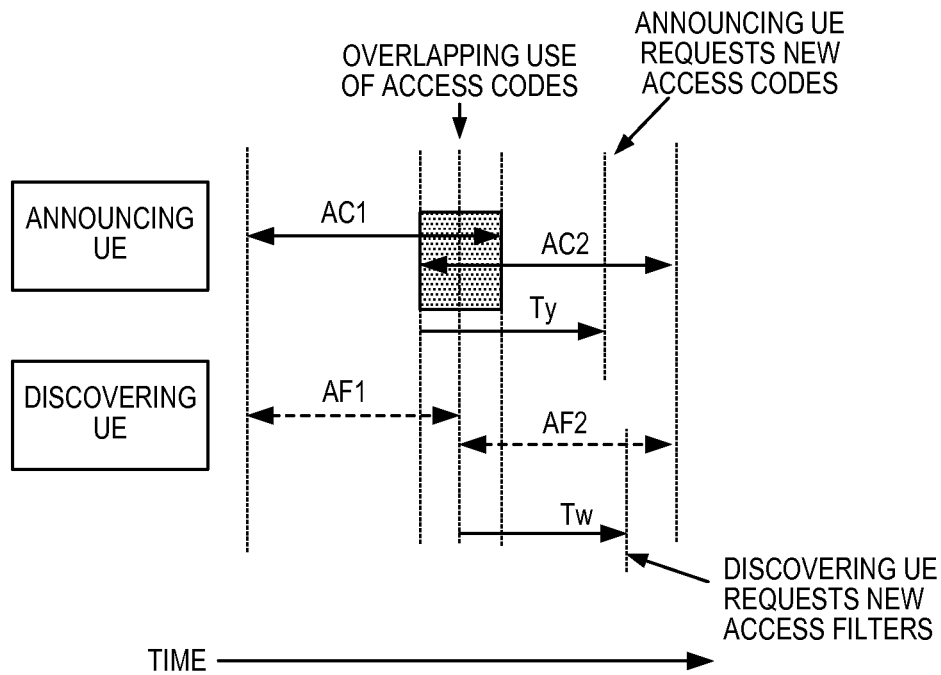
FIG. 6 illustrates an example of the distribution and use of access codes according to some of the techniques disclosed herein.
Figure 7:
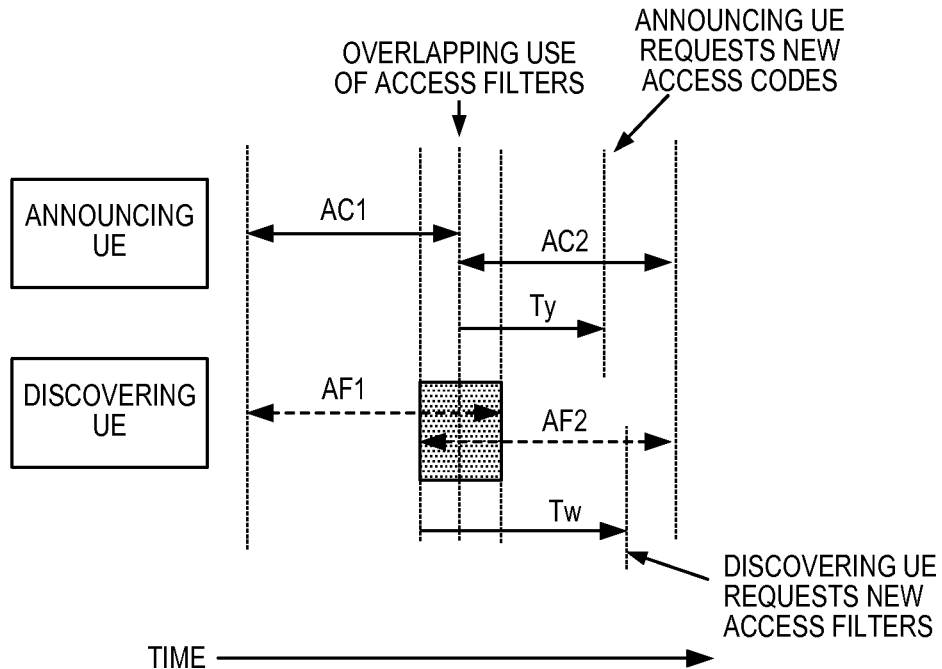
FIG. 7 illustrates another example of the distribution and use of access codes according to some of the techniques disclosed herein.

It will be appreciated that the validity intervals may differ and/or be handled differently in the announcing and monitoring devices, in some embodiments. FIGS. 6 and 7 are timing diagrams illustrating two possible approaches to the handling of validity intervals for a pair of application codes.

In the example shown in FIG. 6, the validity intervals for access codes AC1 and AC2 in the announcing UE partly overlap, such that the announcing UE broadcasts both codes during a transition period formed by the overlapping validity intervals. The discovering UE (i.e., the monitoring UE), on the other hand, uses access filters AF1 and AF2 to monitor for broadcasted access codes, in non-overlapping, successive time intervals. Note that FIG. 6 also shows that the announcing and discovering UEs request new access codes/access filters, prior to the end of the second validity interval, thus allowing time to receive one or more new codes before the second validity interval. Of course, it should be appreciated that while FIG. 6 illustrates an example in which two codes are used in succession, embodiments in which three or more codes are provided at one time to the wireless devices are possible, which means that the time between requests may be extended further.

FIG. 7 illustrates another example. In this case, the validity intervals for access codes AC1 and AC2 in the announcing UE do not overlap. As a result, the announcing UE only broadcasts one access code at a time, with the validity interval for access code AC2 following immediately after the validity interval for access code AC1 expires.

The discovering UE (i.e., the monitoring UE), on the other hand, uses access filters AF1 and AF2 to monitor for broadcasted access codes, using intervals that overlap such that the discovering UE is monitoring for both codes during a transition period formed by the overlapping validity intervals. Like FIG. 7, FIG. 6 also shows that the announcing and discovering UEs request new access codes/access filters, prior to the end of the second validity interval, thus allowing time to receive one or more new codes before the second validity interval. Again, while FIG. 7 illustrates an example in which two codes are used in succession, embodiments in which three or more codes are provided at one time to the wireless devices are possible, which means that the time between requests may be extended further.

Figure 8:
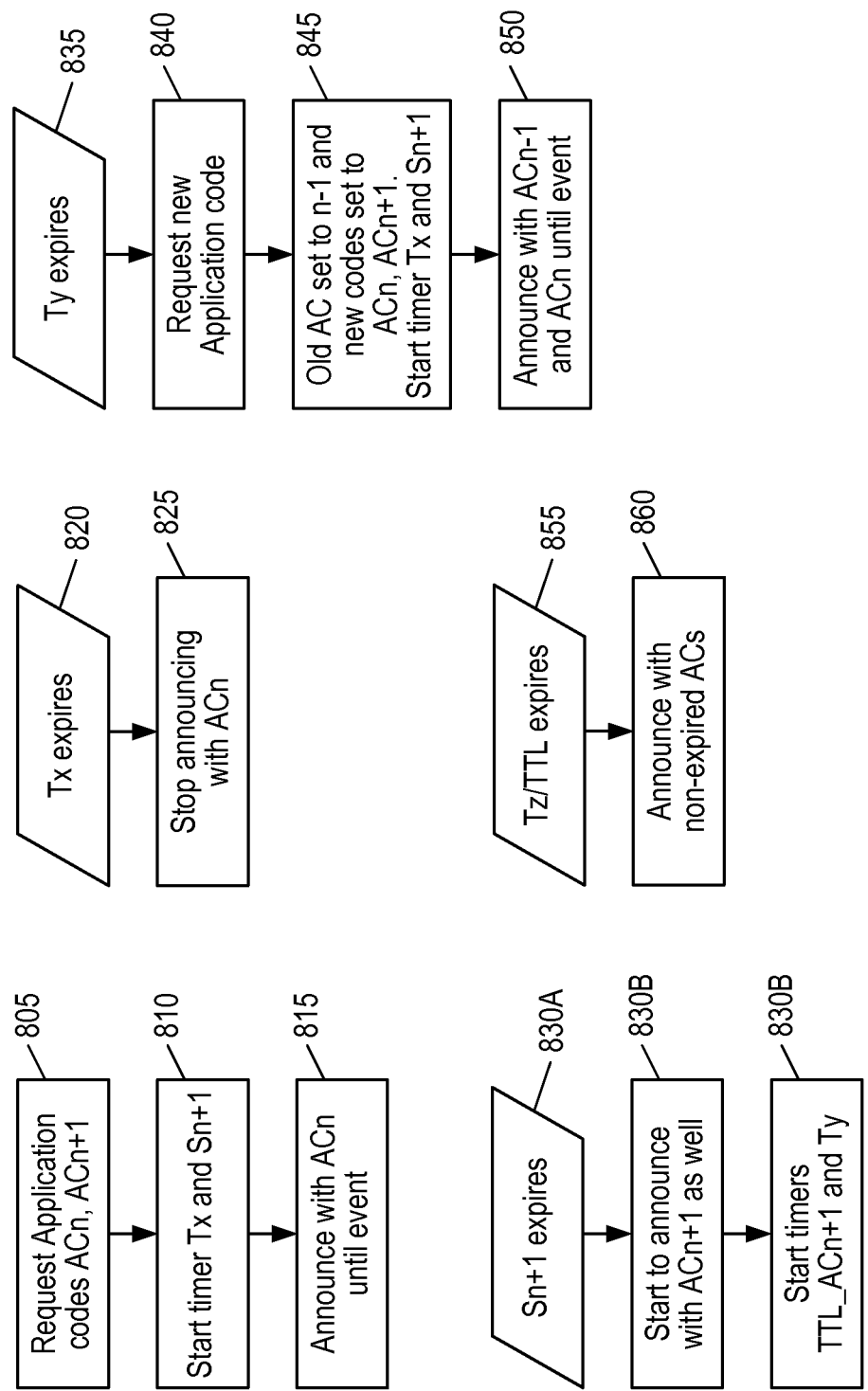
FIG. 8 is a process flow diagram illustrating an example method carried out in an announcing D2D wireless device.

FIG. 8 is a flowchart illustrating the operations carried out by the announcing UE, in an embodiment corresponding to the timeline illustrated in FIG. 6.

The operations of the announcing UE as illustrated in FIG. 8 are detailed below, as follows:

805. The UE request Application codes (ACn, ACn+1) towards the ProSe function. The UE receives ACn and a TTL_ACn which is the TTL for ACn, the UE also receives Application code ACn+1 and Time TTL_ACn+1 which is the TTL for ACn+1 and Time T_ACn+1 which is the start time of ACn+1 related to the TTL_ACn. (Note that in other embodiments, the TTL timer for ACn+1 simply starts when TTL_ACn expires, in which case the T_ACn+1 parameter is not needed.)

Note: TTL is used as an example to illustrate how the active period is determined for each Access code and Access filter. Other mechanisms as e.g. start and stop time for each AC and AF are also possible.

810. Timer Tx is started which is set to the TTL_ACn. Timer Sn+1 is started and is the time when the second announcement code (ACn+1) is supposed to be used. It is set shorter then TTL_ACn and can be, e.g., TTL_ACn-T_ACn+1. The TTL_ACn is the Time to Live for ACn and the T_ACn+1 is the start time of ACn+1 related to the TTL_ACn. (In other embodiments, e.g., those that operate according to the timing diagram shown in FIG. 7, timer Sn+1 is not needed, as there is no overlapping interval for TTL_ACn and TTL_ACn+1.

815. The UE announces with ACn until an event happens.

820. Tx expires, which means that it is time to stop announcing with ACn.

825. The UE stops announcing with Application code ACn.

830. When Sn+1 expires it is time to start using ACn+1.

835. Start to announce with ACn+1 as well.

840. Start timer Ty which is the time until new Application codes is to be requested for. Ty is set shorter than Tz, and is set to allow time for communication with the ProSe Function to retrieve new Application codes. Tz is the time until the Application code ACn+1 is to expire and is set to the received TTL_ACn+1 time.

When setting Ty some randomness can be used to ensure that not all UEs request at the same time.

The UE announces with ACn+1 until an event happens.

845. Ty expires, which means that it is time to request new Application codes.

850. The UE request new Application codes towards the ProSe function.

855. Old Application code is set to ACn-1 and the new Application codes are set to ACn and ACn+1. Timer Tx and Sn+1 are started.

860. The UE announces with Application code ACn-1 and ACn until an event happens.

865. When a TTL timer expires e.g. Tz it is time to stop announce an Application code.

870. Announce with non-expired Application codes

Figure 9:
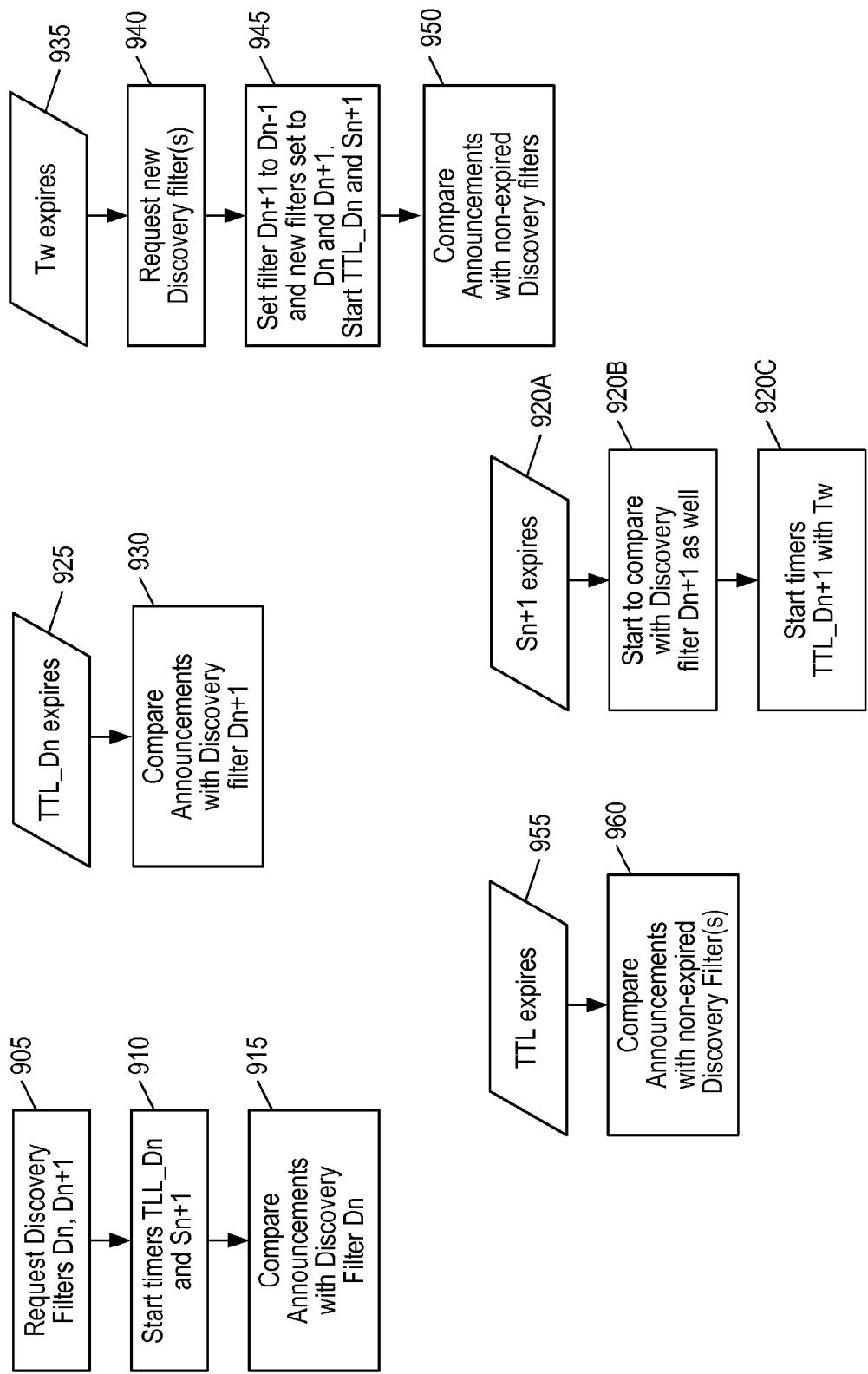
FIG. 9 is a process flow diagram illustrating an example method carried out in a monitoring D2D wireless device.

FIG. 9 is a flowchart illustrating the operations carried out by the monitoring UE, in this case in an embodiment corresponding to the timeline illustrated in FIG. 7. The operations of the monitoring UE as illustrated in FIG. 9 are detailed below, as follows:

905. The monitoring UE requests to receive Discovery filters from the ProSe function. The UE receives a Discovery filter Dn and a time TTL_Dn, which is the TTL for Dn. the UE also receives Discovery filter Dn+1 and time TTL_Dn+1, which is the TTL for Dn+1 and Time T_Dn+1 which is the is the start time of Dn+1 related to the TTL_Dn. Dn and Dn+1 correspond to AF1 and AF2 in FIG. 6.

Note: TTL is used as an example to illustrate how the active period (validity interval) is determined for each Access code and Access filter. Other mechanisms for defining the validity intervals, such as a start and stop time for each AC and AF, may be used.

910. The UE starts the timers TTL_Dn and Sn+1.

915. The UE uses the Discovery filter Dn for comparing to the announced Application code(s) to find a possible match.

920. The timer SN+1 expires

925. The UE starts to compare with Discovery filter Dn+1 as well

930. The UE starts timer Tw and timer TTL_Dn+1. The timer Tw is the time until new Discovery filters are to be requested. Tw is set to allow time for communication with the ProSe Function to retrieve new Discovery filters. When setting Tw, some randomness can be used to ensure that not all UEs request at the same time.

935. TTL_Dn expires, which means that Discovery filter Dn is no longer valid.

940. The UE compares with Discovery filter Dn+1

945. Tw expires, meaning that it is time to request new Discovery filter(s).

950. The UE request new Discovery filter(s) from the ProSe function.

955. The UE sets Discovery filter Dn+1 to Dn-1 and new filters are set to Dn and Dn+1. The timers TTL_Dn and Sn+1 are started.

960. The UE uses the non-expired Discovery filters for comparing to the announced Application code(s) to find a possible match.

965. TTL expires, which means that the corresponding Discovery filter has expired 970. The UE uses the non-expired Discovery filters for comparing with the announced Application code(s) to find a possible match.

Figure 10:
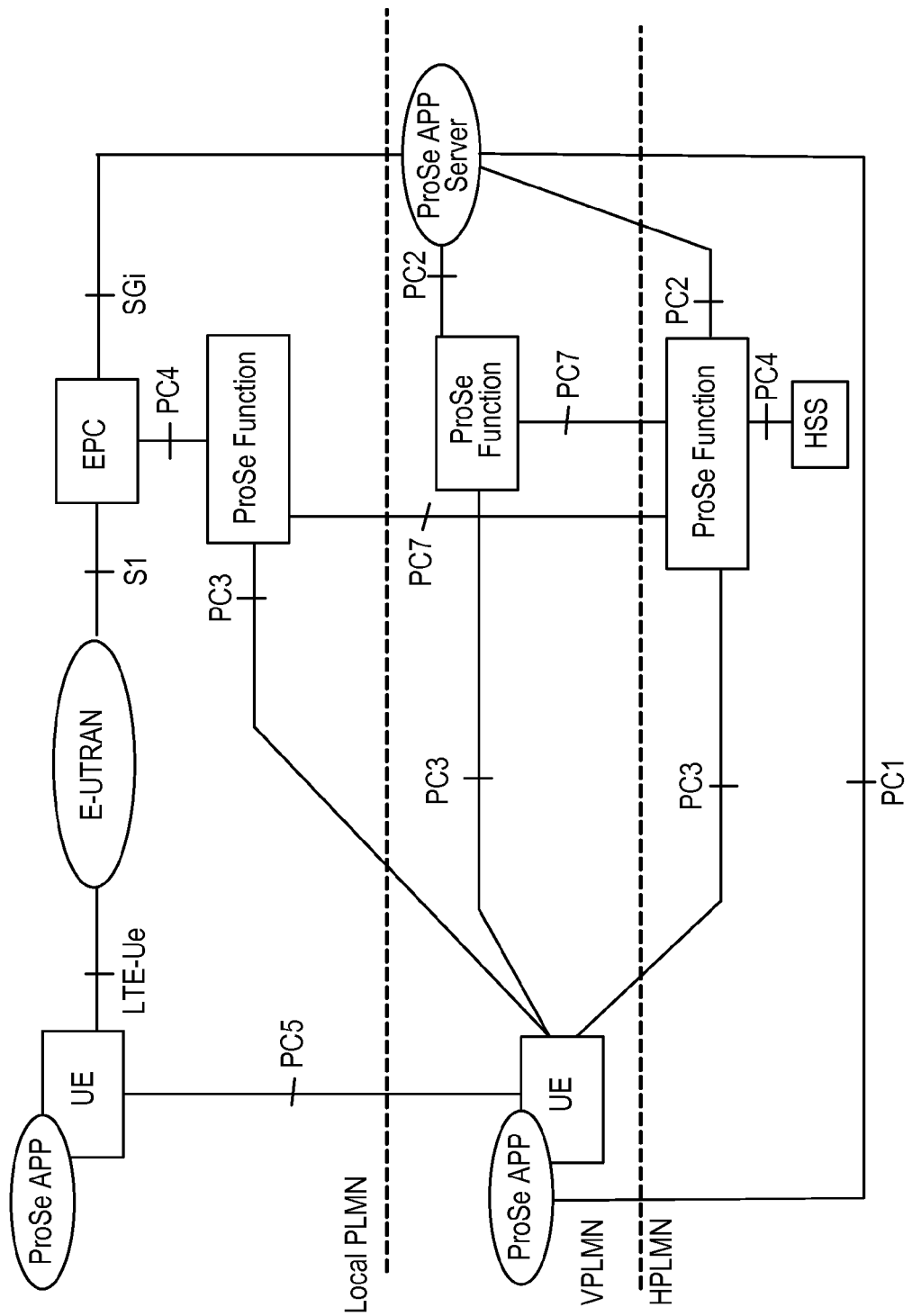
FIG. 10 illustrates the Roaming Reference Architecture illustrated in 3GPP TR 23.703, including the reference point used to request and receive access codes for an announcing UE and to request and receive discovery filters for a monitoring UE.

FIG. 10 is a copy of the Roaming Reference Architecture illustrated in 3GPP TR 23.703. PC3 is the reference point used to request and receive Application codes for an announcing UE and to request and receive Discovery filter(s) for a monitoring UE. PC5 is the reference point used for announcing and monitoring. It will be appreciated that while this provides an example context for implementation of the techniques described herein, the techniques may be applied to networks having different architectures than that shown in FIG. 10.

Figure 11:
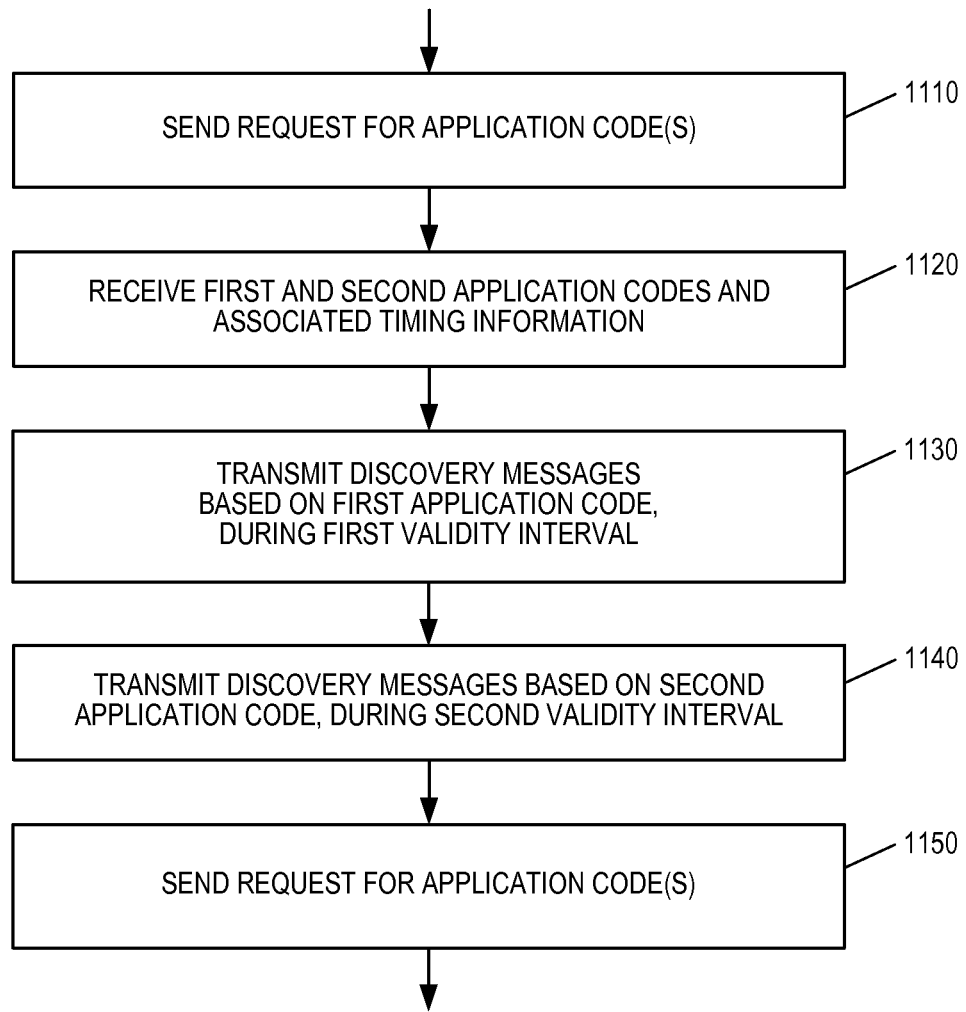
FIG. 11 is another process flow diagram illustrating an example method carried out in an announcing D2D wireless device.
Figure 12:
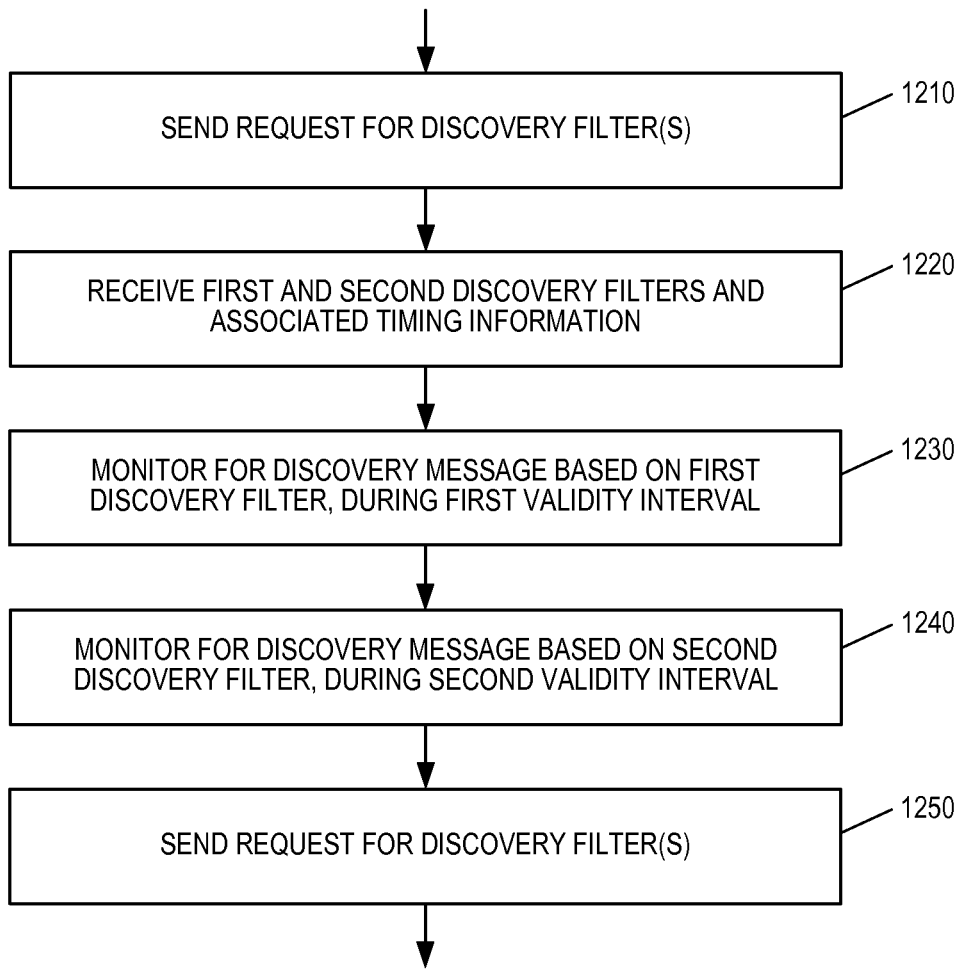
FIG. 12 is a process flow diagram illustrating another example method carried out in a monitoring D2D wireless device.

In view of the above detailed examples of application code handling in the context of D2D devices operating in or in association with an LTE network, it should be appreciated that these techniques may be viewed and applied more generally. FIGS. 11 and 12 illustrate generalized processes that may be carried out in wireless devices acting as an announcing device and monitoring device, respectively. It should be noted that a wireless device may act as both in some cases, whether at the same time or at different times.

FIG. 11 is a process flow diagram illustrating a method that may be implemented in a wireless device configured for operation in a wireless communication network and further configured for device-to-device communication with one or more other wireless devices. As seen at block 1120, the method includes receiving, from a coordinating node, first and second access codes, here referred to as application codes, and associated timing information. The associated timing information defines respective first and second validity intervals for the first and second application codes, such that the first and second validity intervals are at least partly non-overlapping. The coordinating node may be a ProSe server in or associated with an LTE network, for example. It should be noted that while FIG. 11 illustrates a process in which two application codes and associated timing information are received, three or more application codes and associated timing information may be sent in other embodiments.

In some embodiments, the first and second application codes are received in response to a request from the announcing device. This is shown at block 1110, which indicates that the announcing device, prior to receiving the first and second application codes and associated timing information, sends a first application code request to the coordinating node, e.g., via the wireless communication network. The application codes and timing information are received in response to this request.

As shown at blocks 1130 and 1140, subsequent to receiving the first and second application codes and associated timing information, the announcing device transmits, during the first validity interval, one or more discovery messages that include or are based on the first application code, and transmits, during the second validity interval, one or more discovery messages that include or are based on the second application code. In some embodiments, the associated timing information defines completely non-overlapping first and second validity intervals, so that the first and second validity intervals are consecutive but non-overlapping. In others, the intervals may partly overlap, so that the announcing device transmits one or more discovery messages based on each of the first and second application codes during an overlapping transition interval.

The associated timing information may define the first and second validity intervals in several different ways. For example, the associated timing information may comprise first and second time-to-live values, in some embodiments, the first and second time-to-live values indicating respective lengths of the first and second validity intervals. In some embodiments, the second validity interval begins at the end of the first validity interval. In others, the associated timing information comprises a start time value indicating a start time for the second validity interval, such that the second validity interval begins before the end of the first validity interval.

Once the final validity interval expires, new application codes are needed. Thus, as shown at block 1150, a new application code request is sent to the coordinating. In some embodiments, this is done prior to the end of the second validity interval, to allow time for receiving new access codes before the second validity interval expires. The illustrated method can thus be repeated, e.g., such that a third (and fourth, fifth, etc.) application code and associated timing information are received, where the associated timing information defining a third validity time for the third access code, such that the third validity time is at least partly non-overlapping with both of the first and second validity times, and one or more discovery messages that include or are based on the third application code are transmitted, during the third validity interval.

FIG. 12 is a process flow diagram illustrating a corresponding method carried out in a monitoring device. It should be appreciated that the illustrated operations correspond closely to those shown in FIG. 11, except that the monitoring device monitors for (i.e., "listens" for) discovery messages containing a matching code during the first and second validity intervals, rather than broadcasting announcement messages.

As shown at block 1220, the illustrated method includes receiving first and second discovery filters and associated timing information. In some embodiments, this may be in response to a request for discovery filter sent by the monitoring wireless device, as shown at block 1210. The associated timing information defines respective first and second validity intervals for the first and second discovery filters, such that the first and second validity intervals are at least partly non-overlapping. The method further includes, subsequent to receiving the first and second discovery filters and associated timing information, monitoring, during the first validity interval, for a discovery message that includes or is based on the first discovery filter. This is shown at block 1230. Then, as shown at block 1240, the monitoring wireless devices monitors, during the second validity interval, for a discovery message that includes or is based on the second discovery filter.

In some embodiments, the associated timing information comprises first and second time-to-live values, the first and second time-to-live values indicating respective lengths of the first and second validity intervals. In some of these latter embodiments, the second validity interval begins at the end of the first validity interval. In others, the associated timing information comprises a start time value indicating a start time for the second validity interval, such that the second validity interval begins before the end of the first validity interval.

As shown at block 1250, the monitoring device may also send a request for additional discovery filters; this may be done before the second validity is over, so that new discovery filters are received in sufficient time to set up subsequent validity intervals, without interruption. Thus, in some embodiments, the wireless device, subsequent to receiving the first and second discovery filters and associated timing information but prior to the end of the second validity interval: receives a third discovery filter and associated timing information defining a third validity time for the additional discovery filter, such that the third validity time is at least partly non-overlapping with both of the first and second validity times, and monitors, during the third validity interval, for a discovery message that includes or is based on the third discovery filter. It will be appreciated that these techniques can be repeated as necessary.

Figure 13:
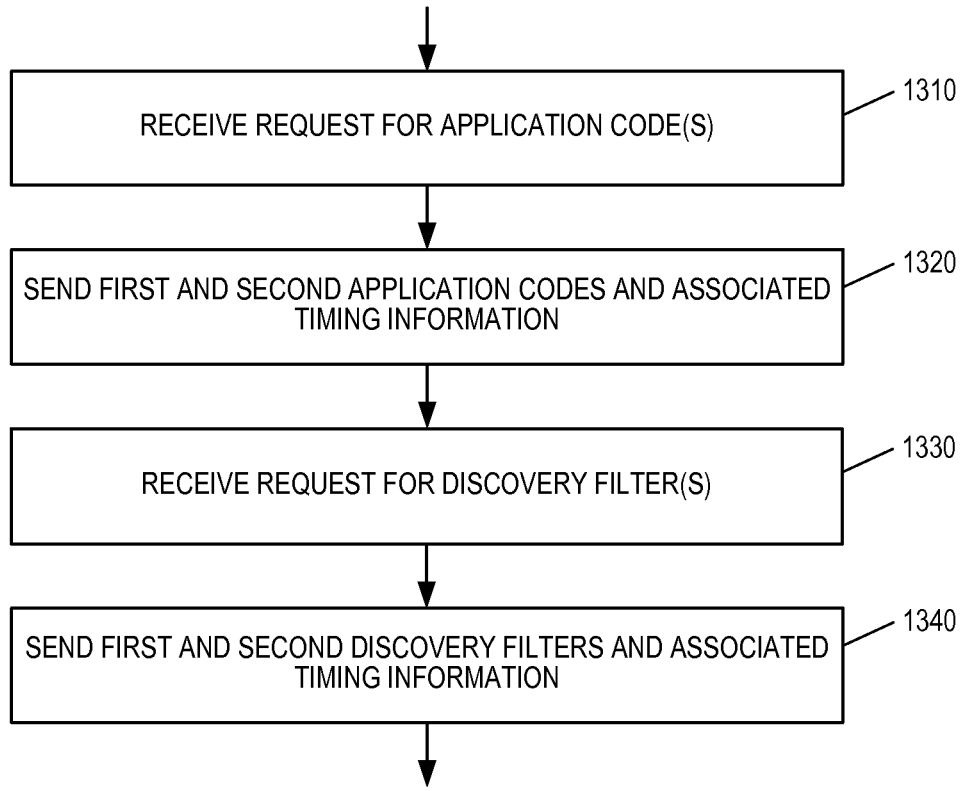
FIG. 13 is a process flow diagram illustrating an example method carried out in a network node.

FIG. 13 illustrates a process flow for a method implemented in one or more network nodes adapted to provide device-to-device-related services to wireless devices operating in a wireless communication network. The network node or nodes are responsible for distributing application codes to announcing wireless devices. Thus, as shown at block 1310, the method includes receiving an application code request from a first wireless device. As shown at block 1320, the method continues with sending first and second application codes and associated timing information to the first wireless device. As discussed above, the associated timing information defines respective first and second validity intervals for the first and second application codes, such that the first and second validity intervals for the first and second application codes are at least partly non-overlapping.

In some embodiments, the same network node or nodes may also be responsible for distributing discover filter codes to monitoring devices. In these embodiments, the method may further comprise, as shown at block 1330, receiving a discovery filter request from a second wireless device. As shown at block 1340, the node or nodes then sends first and second discovery filters and associated timing information to the second wireless device. Once more, the associated timing information defines respective first and second validity intervals for the first and second discovery filters, such that the first and second validity intervals for the first and second discovery filters are at least partly non-overlapping. The first and second discovery filters may correspond to the first and second application codes, respectively, such that monitoring by the second wireless device using the first and second discovery filters will detect discovery messages based on the first and second application codes, respectively.

Embodiments of the presently disclosed techniques include the several methods described above, including the methods illustrated in the process flow diagrams of FIGS. 11, 12 and 13, as well as variants thereof. Other embodiments include mobile terminal apparatus and network node apparatus configured to carry out one or more of these methods. In some embodiments of the invention, processing circuits, such as the processing circuit 210 in FIG. 2 or the processing circuit 10, 20, 30 in FIG. 3, are configured to carry out one or more of the techniques described in detail above. Likewise, other embodiments may include mobile terminals and network node apparatus that include one or more such processing circuits. In some cases, these processing circuits are configured with appropriate program code, stored in one or more suitable memory devices, to implement one or more of the techniques described herein. Of course, it will be appreciated that not all of the steps of these techniques are necessarily performed in a single microprocessor or even in a single module.

Figure 14:
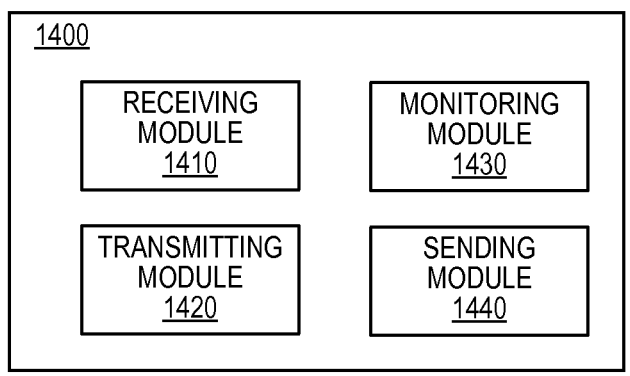
FIG. 14 is a block diagram illustrating functional elements of an example device or computer-readable medium according to embodiments of the presently disclosed techniques.

As noted above, it should be appreciated that the processing circuit, when configured with appropriate program code, may be understood to comprise several functional "modules," where each module comprises program code for carrying out the corresponding function, when executed by an appropriate processor. FIG. 14 illustrates an example arrangement 1400, in which the functionality described herein is visualized in terms of functional modules. The illustrated arrangement 1400 may be understood to represent a processing circuit configured with corresponding program code, or a computer-readable medium comprising program code modules stored therein or thereupon.

The arrangement 1400 shown in FIG. 14 comprises a receiving module 1410, a transmitting module 1420, a monitoring module 1430, and a sending module 1440. Each of these modules is adapted to carry out one or several of the corresponding functions detailed above. For example, in some embodiments, receiving module 1410 is for receiving, from a coordinating node in a wireless communication network, first and second application codes and associated timing information, the associated timing information defining respective first and second validity intervals for the first and second application codes, such that the first and second validity intervals are at least partly non-overlapping. The transmitting module 1420 is for subsequently transmitting, during the first validity interval, one or more discovery messages that include or are based on the first application code, and transmitting, during the second validity interval, one or more discovery messages that include or are based on the second application code. In some of these embodiments, sending module 1440 is for sending a first application code request to the coordinating node, via the wireless communication network, wherein the first and second application codes and associated timing information are received in response to the first application code request. The several variations described above in connection with the description of FIG. 11 are equally applicable to these example embodiments.

In some of these and in some other example embodiments, receiving module 1410 is for receiving first and second discovery filters and associated timing information, the associated timing information defining respective first and second validity intervals for the first and second discovery filters, such that the first and second validity intervals are at least partly non-overlapping. The monitoring module 1430 is for subsequently monitoring, during the first validity interval, for a discovery message that includes or is based on the first discovery filter, and monitoring, during the second validity interval, for a discovery message that includes or is based on the second discovery filter. In some of these embodiments, sending module 1440 is for sending requests for discovery filters to the coordinating node, via the wireless communication network. The several variations described above in connection with the description of FIG. 12 are equally applicable to these example embodiments.

It will be appreciated by the person of skill in the art that various modifications may be made to the above described embodiments without departing from the scope of the present invention. For example, although embodiments of the present invention have been described with examples that reference a communication system compliant to the 3GPP-specified LTE standards, it should be noted that the solutions presented may be equally well applicable to other networks. The specific embodiments described above should therefore be considered exemplary rather than limiting the scope of the invention. Because it is not possible, of course, to describe every conceivable combination of components or techniques, those skilled in the art will appreciate that the present invention can be implemented in other ways than those specifically set forth herein, without departing from essential characteristics of the invention. The present embodiments are thus to be considered in all respects as illustrative and not restrictive.

In the present description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments have been described herein, with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) running on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure, and shall not be restricted or limited by the foregoing detailed description.

What is claimed is:

1. A method, in a wireless device configured for operation in a wireless communication network and further configured for device-to-device communication with one or more other wireless devices, the method comprising:

receiving, from a coordinating node, first and second application codes corresponding to a particular application and associated timing information, the associated timing information defining respective first and second validity intervals for the first and second application codes, such that the first and second validity intervals are at least partly non-overlapping; and, subsequent to receiving the first and second application codes and associated timing information, transmitting, during the first validity interval, one or more discovery messages that include or are based on the first application code, and transmitting, during the second validity interval, one or more discovery messages that include or are based on the second application code.

2. The method of claim 1, further comprising, prior to receiving the first and second application codes and associated timing information, sending a first application code request to the coordinating node, via the wireless communication network, wherein the first and second application codes and associated timing information are received in response to the first application code request.

3. The method of claim 1, wherein the associated timing information defines completely non-overlapping first and second validity intervals.

4. The method of claim 1, wherein the associated timing information comprises first and second time-to-live values, the first and second time-to-live values indicating respective lengths of the first and second validity intervals.

5. The method of claim 4, wherein the second validity interval begins at the end of the first validity interval.

6. The method of claim 4, wherein the associated timing information comprises a start time value indicating a start time for the second validity interval, such that the second validity interval begins before the end of the first validity interval.

7. The method of claim 1, further comprising, subsequent to receiving the first and second application codes and associated timing information but prior to the end of the second validity interval:

receiving a third application code for the particular application and associated timing information defining a third validity time for the third application code, such that the third validity time is at least partly non-overlapping with both of the first and second validity times, and transmitting, during the third validity interval, one or more discovery messages that include or are based on the third application code.

8. A method, in a wireless device configured for operation in a wireless communication network and further configured for device-to-device communication with one or more other wireless devices, the method comprising:

receiving first and second discovery filters corresponding to a particular application and associated timing information, the associated timing information defining respective first and second validity intervals for the first and second discovery filters, such that the first and second validity intervals are at least partly non-overlapping; and, subsequent to receiving the first and second discovery filters and associated timing information, monitoring, during the first validity interval, for a discovery message that includes or is based on the first discovery filter, and monitoring, during the second validity interval, for a discovery message that includes or is based on the second discovery filter.

9. The method of claim 8, wherein the associated timing information defines completely non-overlapping first and second validity intervals.

10. The method of claim 8, wherein the associated timing information comprises first and second time-to-live values, the first and second time-to-live values indicating respective lengths of the first and second validity intervals.

11. The method of claim 10, wherein the second validity interval begins at the end of the first validity interval.

12. The method of claim 10, wherein the associated timing information comprises a start time value indicating a start time for the second validity interval, such that the second validity interval begins before the end of the first validity interval.

13. The method of claim 8, further comprising, subsequent to receiving the first and second discovery filters and associated timing information but prior to the end of the second validity interval:
receiving a third discovery filter for the particular application and associated timing information defining a third validity time for the additional discovery filter, such that the third validity time is at least partly non-overlapping with both of the first and second validity times, and
monitoring, during the third validity interval, for a discovery message that includes or is based on the third discovery filter.

14. A wireless device, comprising a radio circuit configured for communication with a wide-area wireless network and for device-to-device communication with one or more other wireless devices and further comprising a processing circuit configured to control the radio circuit and to:
receive from a coordinating node, using the radio circuit, first and second application codes corresponding to a particular application and associated timing information, the associated timing information defining respective first and second validity intervals for the first and second application codes, such that the first and second validity intervals are at least partly non-overlapping; and,
subsequent to receiving the first and second application codes and associated timing information, control the radio circuit to transmit, during the first validity interval, one or more discovery messages that include or are based on the first application code, and to transmit, during the second validity interval, one or more discovery messages that include or are based on the second application code.

15. The wireless device of claim 14, wherein the processing circuit is further configured to, prior to receiving the first and second application codes and associated timing information, send a first application code request to the coordinating node, via the wireless communication network, wherein the first and second application codes and associated timing information are received in response to the first application code request.

16. The wireless device of claim 14, wherein the associated timing information defines completely non-overlapping first and second validity intervals.

17. The wireless device of claim 14, wherein the associated timing information comprises first and second time-to-live values, the first and second time-to-live values indicating respective lengths of the first and second validity intervals.

18. The wireless device of claim 17, wherein the second validity interval begins at the end of the first validity interval.

19. The wireless device of claim 17, wherein the associated timing information comprises a start time value indicating a start time for the second validity interval, such that the second validity interval begins before the end of the first validity interval.

20. The wireless device of claim 14, wherein the processing circuit is further configured to, subsequent to receiving the first and second application codes and associated timing information but prior to the end of the second validity interval:
receive a third application code for the particular application and associated timing information defining a third validity time for the additional application code, such that the third validity time is at least partly non-overlapping with both of the first and second validity times, and
control the radio circuit to transmit, during the third validity interval, one or more discovery messages that include or are based on the third application code.

21. A wireless device, comprising a radio circuit configured for communication with a wide-area wireless network and for device-to-device communication with one or more other wireless devices and further comprising a processing circuit configured to control the radio circuit and to:
receive first and second discovery filters corresponding to a particular application and associated timing information, the associated timing information defining respective first and second validity intervals for the first and second discovery filters, such that the first and second validity intervals are at least partly non-overlapping; and,
subsequent to receiving the first and second discovery filters and associated timing information, monitor, during the first validity interval, for a discovery message that includes or is based on the first discovery filter, and monitor, during the second validity interval, for a discovery message that includes or is based on the second discovery filter.

22. The wireless device of claim 21, wherein the associated timing information defines completely non-overlapping first and second validity intervals.

23. The wireless device of claim 21, wherein the associated timing information comprises first and second time-to-live values, the first and second time-to-live values indicating respective lengths of the first and second validity intervals.

24. The wireless device of claim 23, wherein the second validity interval begins at the end of the first validity interval.

25. The wireless device of claim 23, wherein the associated timing information comprises a start time value indicating a start time for the second validity interval, such that the second validity interval begins before the end of the first validity interval.

26. The wireless device of claim 21, wherein the processing circuit is further configured to, subsequent to receiving the first and second discovery filters and associated timing information but prior to the end of the second validity interval:
receive a third discovery filter for the particular application and associated timing information defining a third validity time for the additional discovery filter, such that the third validity time is at least partly non-overlapping with both of the first and second validity times, and monitor, during the third validity interval, for a discovery message that includes or is based on the third discovery filter.

27. A method, in one or more network nodes adapted to provide device-to-device-related services to wireless devices operating in a wireless communication network, the method comprising:

receiving an application code request for a particular application from a first wireless device; and sending first and second application codes for the particular application and associated timing information to the first wireless device, in response to the application code request, the associated timing information defining respective first and second validity intervals for the first and second application codes, such that the first and second validity intervals for the first and second application codes are at least partly non-overlapping.

28. The method of claim 27, further comprising:

receiving a discovery filter request for a particular application from a second wireless device; and sending first and second discovery filters for the particular application and associated timing information to the second wireless device, in response to the discovery filter request, the associated timing information defining respective first and second validity intervals for the first and second discovery filters, such that the first and second validity intervals for the first and second discovery filters are at least partly non-overlapping.

29. The method of claim 28, wherein the first and second discovery filters correspond to the first and second application codes, respectively, such that monitoring by the second wireless device using the first and second discovery filters will detect discovery messages based on the first and second application codes, respectively.

30. A network node adapted to provide device-to-device-related services to wireless devices operating in a wireless communication network, the network node comprising a communication interface configured for communication with one or more wireless devices and further comprising a processing circuit configured to control the communication interface and to:

receive an application code request for a particular application from a first wireless device; and send first and second application codes for the particular application and associated timing information to the first wireless device, in response to the application code request, the associated timing information defining respective first and second validity intervals for the first and second application codes, such that the first and second validity intervals for the first and second application codes are at least partly non-overlapping.

31. The network node of claim 30, wherein the processing circuit is further configured to:

receive a discovery filter request for a particular application from a second wireless device; and send first and second discovery filters for the particular application and associated timing information to the second wireless device, in response to the discovery filter request, the associated timing information defining respective first and second validity intervals for the first and second discovery filters, such that the first and second validity intervals for the first and second discovery filters are at least partly non-overlapping.

32. The network node of claim 31, wherein the first and second discovery filters correspond to the first and second application codes, respectively, such that monitoring by the second wireless device using the first and second discovery filters will detect discovery messages based on the first and second application codes, respectively.

* * * * *